(12) United States Patent
Chollet

(10) Patent No.: US 10,029,613 B2
(45) Date of Patent: Jul. 24, 2018

(54) SYSTEM AND METHOD FOR DETECTING POTENTIAL ACCIDENT SITUATIONS WITH A CAR

(71) Applicant: Open TV Inc., San Francisco, CA (US)

(72) Inventor: Bertrand Chollet, Maurepas (FR)

(73) Assignee: OPENTV, INC., San Francisco, CA (US)

( * ) Notice: Subject to any disclaimer, the term of this patent is extended or adjusted under 35 U.S.C. 154(b) by 377 days.

(21) Appl. No.: 14/696,019

(22) Filed: Apr. 24, 2015

(65) Prior Publication Data
US 2015/0307108 A1    Oct. 29, 2015

(30) Foreign Application Priority Data
Apr. 28, 2014    (EP) .................................... 14166245

(51) Int. Cl.
*H04N 7/18*    (2006.01)
*B60Q 9/00*    (2006.01)
*G07C 5/00*    (2006.01)
*G08G 1/123*    (2006.01)
*G08G 1/16*    (2006.01)

(52) U.S. Cl.
CPC ............ *B60Q 9/008* (2013.01); *G07C 5/008* (2013.01); *G08G 1/123* (2013.01); *G08G 1/164* (2013.01); *H04N 7/18* (2013.01)

(58) Field of Classification Search
None
See application file for complete search history.

(56) References Cited

U.S. PATENT DOCUMENTS

2012/0161951 A1*  6/2012  Ito ........................ B60Q 9/008
                                                        340/435

FOREIGN PATENT DOCUMENTS

| FR | 2992917 A1 * | 1/2014 | ............... G08G 1/04 |
| FR | 2992917 A1 | 1/2014 | |
| GB | 2506627 A | 4/2014 | |
| JP | 2003058978 A | 2/2003 | |

OTHER PUBLICATIONS

European Search Report dated Aug. 24, 2015.
European Search Report for EP 14166245.2 dated Oct. 24, 2014.

* cited by examiner

*Primary Examiner* — Heather Jones
(74) *Attorney, Agent, or Firm* — Harness, Dickey & Pierce, P.L.C.

(57) ABSTRACT

A method is disclosed for detecting potential accident situations with a vehicle driven by a driver. In an embodiment, the method includes collecting behavior data of the vehicle by sensors located in the vehicle; obtaining a position of the vehicle; transmitting the behavior data and the position of the vehicle to a control center; selecting at least one traffic monitoring camera based on the position of the vehicle; acquiring images by the traffic monitoring camera, the images including the vehicle; transmitting the images to the control center; analyzing the behavior data for detecting a driver's abnormal condition; analyzing the images for detecting an abnormal condition of the vehicle; and if the two analyses detect an abnormal condition, registering the vehicle in a probable accident list.

12 Claims, 1 Drawing Sheet

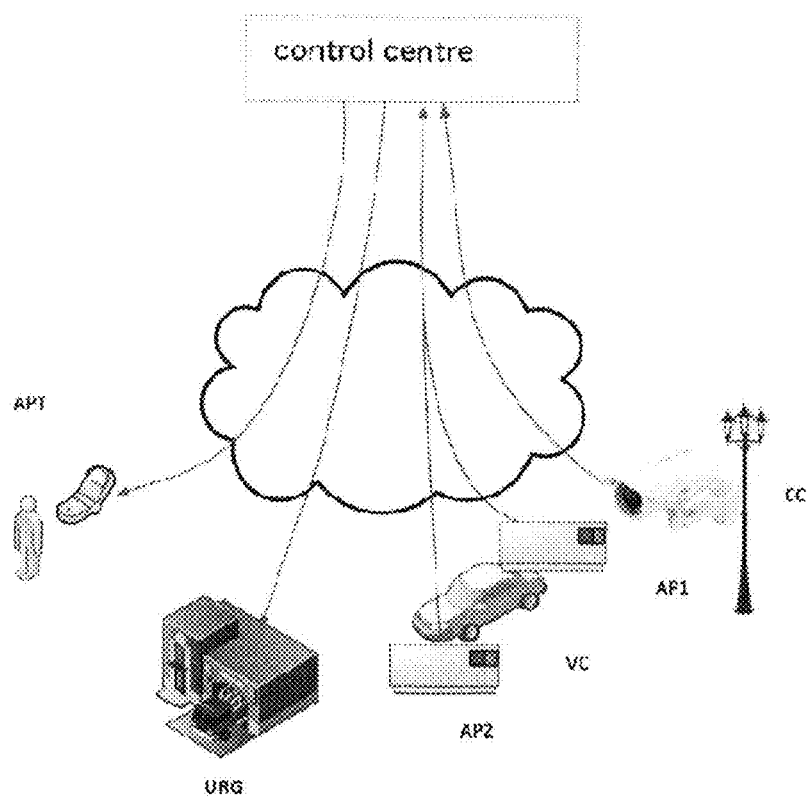

SYSTEM AND METHOD FOR DETECTING POTENTIAL ACCIDENT SITUATIONS WITH A CAR

PRIORITY STATEMENT

The present application hereby claims priority under 35 U.S.C. § 119 to European patent application number EP 14166245.2 filed Apr. 28, 2014, the entire contents of which are hereby incorporated herein by reference.

INTRODUCTION

Certain public authorities have the permanent objective of reducing the number of traffic accidents. To this aim, many initiatives have been launched with encouraging results. Among these initiatives there are awareness-raising campaigns concerning speed or alcohol, the tightening of controls and of speed limits as well as the increase of the shock resistance of cars. There are still many means for reaching this aim such as the training of new drivers, the improvement of roads etc.

Thanks to these efforts one can see, year by year, a reduction in road-related deaths and injuries.

Another category of means has been developed by car builders as a supplement to driving. In this category there are:

BLIS (Blind Spot Information System) which detects objects in the blind spot. The system is programmed for detecting cars, but also motorcycles, by day and by night. Provision is also made not to react to parked cars, crash barriers or obstacles.

Dynamic Lane Assist. This system identifies the position of the car with respect to lane markings on the ground thanks to cameras. If the vehicle deviates too much from its ideal trajectory, the system sends the driver a warning and the steering wheel corrects the trajectory on its own.

Attention monitoring. In order to prevent drivers from falling asleep at the steering wheel, the manufacturers have developed an attention monitoring system which monitors the driver's blinks. A camera constantly records the frequency and the duration of the motions of their eyelids. By comparing the values registered by the system with previously acquired data, the system perceives the risks of falling asleep and informs the driver as quickly as possible . . . and indicates the nearest resting area to him thanks to the navigation system.

Automatic recognition of traffic signs. Learning the Highway Code is almost of no use anymore with this system where the digital display informs the driver about all traffic signs (in particular those related to speed limits) throughout their journey on the motorway. An alarm can indicate the exceeding of a speed limit recognized by the onboard camera.

Detection of the environment of the vehicle. This system is based on a multitude of technologies which are necessary for the acquisition of multiple data: cameras, advanced radar sensors, for long and short distances, as well as laser sensors. The information acquired by the sensors is transmitted to a computer by a data bus with time control. The computer unit then merges the data in order to generate a synthetic image of the environment of the vehicle. The interest of such a system appears clearly in the case of a vehicle entering a congested motorway. In order to assess the traffic in its entirety, the driver should usually concentrate on what is happening before them while turning round to ensure that there are no vehicles out of the field of vision of the external mirrors. With the environment detection system, he/she will have one single image with the description of the different lanes and all the vehicles which are running thereon.

Dynamic Light Assist. This main-beam headlight management assistant allows the driver not to worry anymore about main-beam headlights, as they are activated by default when the traffic allows it. Certain cars thus pass automatically from main-beam headlights to dipped-beam headlights and vice versa, according to the traffic coming the other way or cars driving before them.

Assisted Parking and automatic parking. It allows to let the car do all the necessary manoeuvres for parking with a simple click.

Detector of blood-alcohol level. To start the car, the driver has to blow into a sensor linked to the vehicle which analyses the level of alcohol in the breath. If the level is above a threshold, the vehicle will not start.

These different means have proved to be effective and contribute to decrease accidents. Nevertheless, this search for decrease is constant and manufacturers continue their studies to this aim.

SUMMARY

In the present application a method is provided for detecting potential accident situations with a vehicle driven by a driver, said method comprising the following steps:
collecting behaviour data of the vehicle by sensors located in the vehicle,
obtaining a position of the vehicle,
transmitting the behaviour data and the position of the vehicle to a control centre,
selecting at least one traffic monitoring camera based on the position of the vehicle,
acquiring images by said traffic monitoring camera, these images comprising the vehicle,
transmitting these images to the control centre,
analysing the behaviour data for detecting a driver's abnormal condition,
analysing the images for detecting an abnormal condition of the vehicle,
if the two analyses detect an abnormal condition, registering said vehicle in a probable accident list.

BRIEF DESCRIPTION OF THE DRAWING

This invention will be better understood thanks to the annexed FIGURE which shows the different elements of an embodiment of the invention, namely a control centre in communication with a vehicle and with third parties.

DETAILED DESCRIPTION

This invention is based on the combined use of behaviour data collected in the vehicle and data collected outside the vehicle. In the first category, there are the sensors of attention, temperature, pressure (on the seat), and sound level with regards to the driver, as well as sensors of the vehicle such as for pressure of the tyres, vibration, temperature of the engine etc. Sensors may be included in the steering wheel to detect the driver's heartbeat or the perspiration level.

This data can be sent to the control centre by the communication means of the vehicle, for example via the mobile phone integrated in the vehicle. In case of absence of such a phone, it is possible to have a SIM card only dedicated to the data communications via the mobile telephone network.

Another solution is to use the driver's mobile phone and the data collected by the vehicle are transmitted to the phone via Bluetooth. The mobile phone serves as a relay to access the control centre.

In the same way, the position of the vehicle can be acquired by an onboard GPS and treated like other data or it can be acquired by the driver's GPS (being part of the driver's mobile phone).

This behaviour data is preferably anonymous and is then analysed in order to detect an abnormal situation. For each piece of data, a range is established which defines normality. If any of the data is outside this range, an abnormal condition is detected.

In order to take into account each user and each vehicle, a phase of initialization is proposed during which the vehicle acquires data which is considered as reference data points. Of course, some of them such as the temperature inside the vehicle must be weighted depending on the outside temperature.

The second data category comes from traffic monitoring cameras which continuously analyse traffic conditions. As soon as the data of a vehicle reaches the control centre, the position of the vehicle allows for the determination as to which camera is active in that area. During an area of initialization, each portion of a camera's view is associated with a position. Thus it will be possible to determine which region of the image is supposed to contain the concerned vehicle.

According to one embodiment, it is only when an abnormal condition has been detected in the behaviour data of the vehicle that the localization by a camera is initiated.

With the localization of the vehicle, a database is accessed in order to find the traffic conditions in the area in which the vehicle is situated. This data indicates the position of a stop sign, of a traffic light, a speed limit, the road surfaces for traffic in each direction etc.

Thus the analysed images will allow the detection of an abnormal situation of the vehicle with respect to its environment. Moreover, according to one embodiment, it is possible to find the type of vehicle on the basis of the analysis of the image and of a database containing a large number of vehicle types. Once this type is known it is possible to determine if the vehicle shows particularities which can create a dangerous situation, such as large luggage on the roof, a silencer becoming loose, an open door.

The analysis of these images allows for the determination of an abnormal situation of the vehicle in its environment. The combination of an abnormal situation relating to the behaviour data of the vehicle with an abnormal situation relating to the environmental data of the vehicle triggers the registration of said vehicle in a probable accident list.

Moreover, several actions can be taken by the control centre:
a) informing the police and/or emergency services,
b) informing the driver, via their mobile phone or via the vehicle,
c) warning people near the vehicle.

In the register a), the warning message can contain other information such as the type of abnormal situation detected. A filter can be applied in order to alert the emergency services only if the accident risk is high. For example, if an object has been detected on the roof of the vehicle, this is not yet a high risk condition. If however the vehicle is driving in the wrong direction, the risk is high.

For this purpose, the verification conditions can involve a priority degree associated with each verified parameter. According to the maximum priority degree detected during the analysis, the actions a), b), or c) are triggered. It is possible that none of the actions is triggered if the priority is weak even if abnormal conditions are detected. In this case, the registering of said vehicle in the probable accident list will be used for recognizing the areas and time for which prevention measures must be taken.

If it has been decided to call the police and/or emergency services, the transmitted message will comprise the maximum amount of information which may help them. This includes of course the vehicle position, which is updated continuously, as it can vary, as well as the description of the detected abnormal condition. This message may be accompanied by the image taken by the camera to facilitate the identification of the vehicle.

The driver can be warned by different means. The vehicle itself is a privileged means to warn the driver, by a sound and/or light signal. According to the type of abnormal condition, for example driving the vehicle in the wrong direction in a one-way section or crossing the white line, it is possible to actuate the alarm in order to warn nearby vehicles. This can also be used during sleepiness detection.

As for the third category, the widespread use of smart phones allows for an application for communication with the control centre to be loaded. Two modes are conceived, one called with local filter and the other one with centralized filter. According to the first mode, all warning messages are sent to all devices which are in communication with the control centre. These messages contain the position of the concerned vehicle and this position will be used for filtering the messages so as not to uselessly alert a third party. The position contained in the message is compared to the position of the portable device of said person and if the two positions are close to each other, the filter will let the message through. The user can define the actions to be taken, namely a sound signal, a vibration, a light signal or a combination of the three actions.

In the mode called with central filter, the portable device (smartphone, tablet PC, connected watch) regularly transmits its position to the control centre. It establishes the list of mobile devices concerned by a warning message for a comparison of the position of the vehicle with the position of each mobile device. A specific message is then addressed to the mobile devices in the area near the vehicle.

According to one embodiment, a process of initialization at the control centre identifies the vehicle by an identifier. Moreover, a portable device (or several) is associated with this identifier and each time an abnormal condition is detected, the warning message is sent to the identified portable device. This allows for the monitoring of a commercial vehicle fleet or one's own car when it is in the hands of a third party.

FIG. 1 shows an example of realisation of the invention. The control centre is connected with the vehicle VC through Internet via a mobile network. The vehicle includes sensors AP2 for the parameters of the vehicle as well as for collecting the driver's data. Other sensors AP1 can be placed on the driver, for example the driver's mobile phone.

The images are acquired by at least one camera CC which will point on at least one section comprising the vehicle VC.

According to the priority degree of the abnormal conditions, it is possible for the control centre to send a warning message to an emergency centre URG. In the same way, and as described above, a third party APT which is near the vehicle can be informed about the imminent danger.

What is claimed is:

1. A method for detecting potential accident situations with a vehicle driven by a driver, said method comprising:

collecting behaviour data of the vehicle by sensors located in the vehicle, obtaining a position of the vehicle, transmitting the behaviour data and the position of the vehicle to a control centre, selecting at least one traffic monitoring camera based on the position of the vehicle, acquiring images by said traffic monitoring camera, the images including the vehicle, transmitting the images to the control centre, analysing the behaviour data for detecting a driver's abnormal condition, analysing the images for detecting an abnormal condition of the vehicle, and if the two analyses detect an abnormal condition, registering said vehicle in a probable accident list, wherein, the driver has a portable device configured to communicate with the control centre, the method further includes transmitting, from the control centre, a warning message to the portable device if the vehicle is registered in the probable accident list, and the probable accident list is a list of vehicles.

2. The method of claim 1, wherein the portable device is integrated in said vehicle.

3. The method of claim 1, wherein the portable device includes a geolocation module, configured to determine a current position and it is independent of the vehicle, and wherein the warning message includes the position of the vehicle, the portable device being selected by a comparison between the position of the vehicle and the current position.

4. The method of claim 1, wherein at least one third party has a third party portable device comprising a geolocation module, configured to determine a third party position, said method further comprising:

receiving a warning message containing the position of the vehicle, and comparing the position of the vehicle with the third party position and if the positions are close to each other, sending an audio and/or visual signal to the third party portable device.

5. The method of claim 1, wherein the detection of a driver's abnormal condition is determined by a comparison with reference behaviour data of the vehicle established during a phase of initialization.

6. The method of claim 1, wherein the detection of an abnormal condition of the vehicle includes at least:

extracting, from a database, road requirements near the position of the vehicle, the abnormal condition of the vehicle being detected if the position of the vehicle does not meet the road requirements.

7. The method of claim 6, wherein a road requirement is the maximum speed at the position of the vehicle, said method including:

transmitting a current speed of the vehicle with the behaviour data, and comparing the current speed with the maximum speed, an abnormal condition being established if the current speed is higher than the maximum speed.

8. A system for detecting a potential accident situation of a vehicle driven by a driver, the system comprising:

traffic monitoring cameras;

means for communication with at least one vehicle for receiving behaviour data of the vehicle captured by sensors;

means for receiving a position of said vehicle;

a control centre, the control centre including means for selecting at least one monitoring camera based on the position of the vehicle and acquiring images of said camera for monitoring the traffic, the images including the vehicle, means for analysing the behaviour data to detect a driver's abnormal condition, and for analysing the images to detect an abnormal condition of the vehicle, and means for registering, if the two analyses detect an abnormal condition, said vehicle in a probable accident list; and a portable device of the driver, the portable device being configured to communicate with the control centre, wherein the control centre is configured to transmit a warning message to the portable device if the vehicle is registered in the probable accident list, and wherein the probable accident list is a list of vehicles.

9. The system of claim 8, wherein the control centre further includes means for communication with the portable device of said driver, and means for transmitting the warning message to said portable device if the vehicle is registered in the probable accident list.

10. The system of claim 8, wherein the control centre further includes means for receiving a position of a third party portable device, and means for comparing the position of the third party portable device with the position of said vehicle and for transmitting a warning message to said third party portable device if the positions of the third party portable device and the position of said vehicle are close to each other.

11. The system of claim 8, further comprising:

means for detecting an abnormal condition of the vehicle by extraction, from a database, of road requirements near the position of the vehicle, the abnormal condition of the vehicle is detected if the position of the vehicle does not meet the road requirements.

12. The system of claim 8, further comprising:

means for transmitting a warning message to an emergency service.

* * * * *